Jan. 17, 1967     D. S. WILSON     3,298,756

DIAPHRAGM THRUST BEARING

Filed May 14, 1964

INVENTOR.
DONALD S. WILSON

BY Brumbaugh, Free, Graves & Donohue his ATTORNEYS

United States Patent Office 3,298,756
Patented Jan. 17, 1967

3,298,756
DIAPHRAGM THRUST BEARING
Donald S. Wilson, West Hurley, N.Y., assignor to Rotron
Manufacturing Company, Inc., Woodstock, N.Y., a
corporation of New York
Filed May 14, 1964, Ser. No. 367,444
12 Claims. (Cl. 308—135)

This invention relates to thrust bearings for rotating machinery, and more particularly to an improved self-adjusting thrust bearing arrangement by means of which starting and running torques are minimized and bounce due to vibratory thrust forces effectively damped and minimized.

Conventionally, sliding contact thrust bearings for rotating machinery such as electric motors and the like, are designed to accommodate the particular operating conditions of the device in which they are to be used. The maximum expected thrust forces are determined and the bearing designed with sufficient bearing area so that the maximum load per square unit of bearing area is within the capabilities of the bearing materials. Clearances and allowable end play are also predetermined within the limits prescribed by the overall machine design. Although the bearing design may be optimum for operation under maximum thrust force conditions, they present unnecessarily large contact surfaces, and thus high friction, during periods when the actual thrust forces are below the allowable maximum. One effect of this is an increased torque requirement when starting the machinery from rest. Conventional bearings suffer an additional disadvantage in that because of their rigid construction they cannot effectively damp or absorb vibratory thrust forces such as are prevalent in alternating current electric motors.

In accordance with the present invention, an improved form of thrust bearing is provided which eliminates the above-described shortcomings of existing bearing configurations, and it is the primary object of the present invention to provide such an improved thrust bearing.

A further object of the present invention is to provide a novel thrust bearing having resilient qualities such that vibratory thrust loads may be readily damped.

Another object of the present invention is to provide an improved thrust bearing structure wherein the thrust bearing surface is adjustable with the magnitude of the thrust load, whereby the unit loading of the thrust bearing is maintained relatively low over a wide range of thrust loads.

Yet another object of the present invention is to provide a novel thrust bearing arrangement of extremely simple construction and low cost but which is rugged and effective over a wide range of thrust loads.

An additional object of the invention is to provide a simple improved thrust bearing structure particularly adapted to damp vibratory thrust loads in rotating machinery such as electric motors and the like.

Still another object of the invention is to provide a rugged, simple thrust bearing which may operate with or without added lubricants.

A further object of the invention is to provide an improved thrust bearing arrangement wherein end play is controlled without the necessity of shimming as required in convention constructions.

Briefly, the improved thrust bearing of the present invention consists of two basic elements. The first of these is an annular groove formed around the shaft or inner element of two relatively rotating bodies, with one or both of the shoulders defining the groove sloping away from each other from the innermost to the outermost point thereof. The groove is of a depth such that the diameter at its root is the minimum required for the necessary structural rigidity of the shaft.

The other element of the bearing structure is a resilient diaphragm member having a thickness somewhat less than the minimum width of the annular groove in the shaft, this difference providing the requisite end play, and a circular opening at its center. The opening is made slightly greater in diameter than the root diameter of the annular groove in the shaft. The diaphragm element is fixedly secured at its outer edges in the outer relatively rotating member, with the aperture therein engaging the groove on the shaft member. The diaphragm thus rotates relative to the shaft with a portion of it between the shoulders defining the annular groove therein.

With the two rotating elements in perfect alignment, such as with the machinery at rest in a horizontal position, the diaphragm is out of contact with the shaft and no friction is present during relative rotation therebetween. Accordingly, no component of the torque necessary for starting is due to the thrust bearing. Upon application of an axial or thrust force to either of the two rotating members, one or the other of the groove-defining shoulders is brought into contact with the surface of the diaphragm element. Depending upon the resiliency (or conversely, the stiffness) of the diaphragm, which is selected depending upon the range of thrust loads expected, more or less of the shoulder is brought into contact with the diaphragm member. The resilient diaphragm not only serves to damp or absorb thrust loads applied to it, but since the bearing contact area increases with an increase in the thrust force, and vice versa, maintains the unit bearing load, e.g. pounds per square inch, substantially constant over a wide range of thrust forces. Moreover, the end play between the elements is established by the bearing structure without the necessity for shimming, as is required in conventional thrust bearings.

By providing both shoulders of the groove with divergently shaped surfaces, the bearing is bi-directional in operation. In one embodiment to be described, the shoulders conform to a portion of the surface of a sphere, while in another embodiment they are conical in configuration. Various combinations of materials are suitable for the shoulders and the diaphragm element depending upon such factors as whether or not a lubricant is desired, the magnitude of the forces to be accommodated in the particular piece of machinery with which the bearing is to be used, etc.

The foregoing and other objects, features and advantages of the present invention will become more apparent from the following detailed description thereof, when read in conjunction with the accompanying drawings in which.

Figure 1:
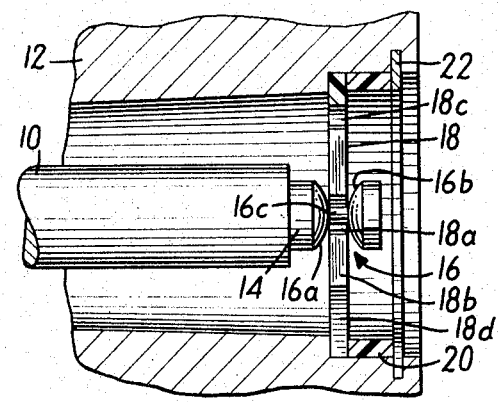
FIGURE 1 is a partial cross section illustrating the construction of the thrust bearing of the invention.

In FIGURE 1, the numerals 10 and 12 indicate two relatively rotating elements of a rotating machine. The member 10 for example might be a shaft while 12 might be the housing of the structure and the two elements are relatively rotatable with respect to each other. Any suitable form of journal bearing (not shown) may be provided between the elements 10 and 12.

The shaft shown in the example of FIGURE 1 is provided with a reduced diameter portion 14 at one end thereof about which is formed the annular circumferential groove indicated generally at 16. It will be understood of course, that the diameter reduction may be eliminated and the groove provided in a constant diameter shaft. The groove is of constant depth and is defined by a pair of shoulders 16a, 16b, while the bottom of the groove, or root diameter is indicated at 16c. The latter is preferably made as small as possible consistent with the required mechanical strength of the shaft element.

Figure 2:
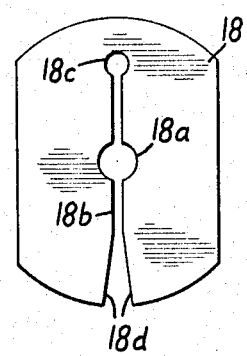
FIGURE 2 is a front view of the diaphragm element of the invention.

Rigidly mounted in the outer member 12 is a flexible diaphragm element 18, a front view of which is shown in FIGURE 2. The diaphragm 18 is secured in a suitably provided recess in the member 12 by means of a spacing washer 20 and a snap ring 22. The width of the element 18 is made just slightly less than the minimum width, i.e. at the root, of the groove 16.

As seen in FIGURE 2, the diaphragm is provided with a generally circular central aperture 18a of a diameter greater than the root diameter of the groove 16, and a slot 18b extending from one edge of the diaphragm through the central aperture and almost through to the opposite side. The blind end of the slot 18b is terminated in a circular opening 18c and the open end thereof slightly flaired at 18d. The flair, the groove, and the terminal aperture 18c allow the diaphragm to be slipped over the root portion of the groove 16 on the shaft 10 to enable engagement thereof with the aperture 18a.

As shown in FIGURE 1, the shoulders 16a and 16b defining the annular groove 16 are closest to one another at the root diameter of the groove and slope away from each other with the increase in diameter. In the embodiment of FIGURE 1, each of these shoulders is a curved surface, which for example may be a portion of the surface of a sphere whose center lies along the axis of the shaft 10. It will be understood that the curvature of the shoulders need not be spherical, but can be of any other form providing continuously divergent surfaces. However, for purposes of the description herein, all forms of curved shoulders will be referred to as spherical.

The unique operating advantages afforded by the foregoing structure can be best explained by reference to FIGURES 3A, 3B, 4A and 4B. In the rest position, i.e., with no axial thrust forces set up between the relatively rotating members 10 and 12, the diaphragm element will remain unflexed, as seen in FIGURE 1. Since the diameter of the groove and the thickness of the diaphragm 18 is less than the minimum width of the groove, essentially no contact is made between the two elements of the bearing under these conditions.

Figure 3A:
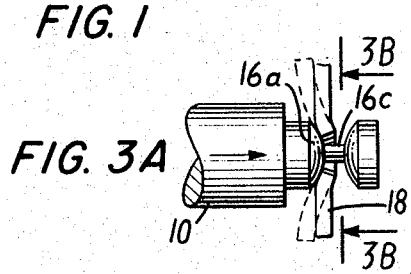
FIGURES 3A, 3B, 4A, 4B are segmental views illustrating the manner of operation of the thrust bearing.

However, if a thrust force in the direction of the arrow shown in FIGURE 3A is applied, for example, to the shaft member 10, the spherical shoulder 16a is brought to bear against the diaphragm 18. Since the latter is resilient, it will deflect to an extent determined by its resiliency, i.e., its spring rate, the magnitude of the thrust force, and the radius of curvature of the shoulder. The deformation of the diaphragm has two effects. Firstly, it damps or absorbs the thrust force and tends to maintain the members 10 and 12 in proper alignment axially. Secondly, as the thrust force increases, it enables a greater area of the diaphragm 18 to be brought into contact with the shoulder 16a. Therefore, as the thrust force increases, a greater amount of thrust bearing area will be provided and the unit bearing pressure will be maintained relatively constant.

Figure 3B:
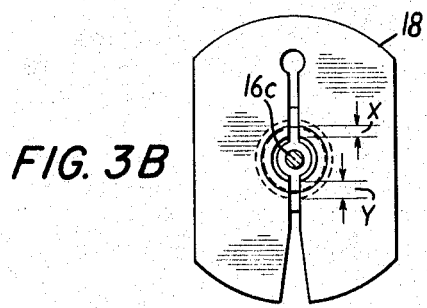

The latter effect may be seen by comparison of the solid and dotted representations of the diaphragm element 18 in FIGURES 3A and 3B. In these views, as well as FIGURES 4A and 4B, for convenience of illustration, it is assumed that the shaft portion remains axially fixed and the outer element 12 moves relative to it to provide the thrust forces. In many applications, the reverse would be true, but the deflection of the diaphragm will be similar.

With a given amount of thrust force, the diaphragm will assume its solid line position and be deflected a certain amount. The area of contact between the diaphragm 18 and the shoulder 16a is shown in FIGURE 3B in solid line, as a ring having a radial thickness X. An increase in thrust force will result in additional deflection of the diaphragm 18 causing the latter to assume the position indicated by dotted line in FIGURE 3A with respect to the shoulder 16a.

The area of contact between the diaphragm 18 and the shoulder 16a correspondingly increases, as shown by the wider dotted annular area Y in FIGURE 3B. Accordingly, it is seen that the bearing contact area varies directly as the thrust load, with the consequence that the thrust force per unit area, i.e., bearing pressure, remains substantially constant. The bearing is thus self-adjusting over a range of thrust loads and enables the bearing designer to make the optimum selection of bearing materials and sizes.

As noted above, the radius of curvature of the shoulder affects the extent of axial motion permitted by the bearing, as well as the unit bearing pressure. For a diaphragm of a given spring rate, a larger radius of curvature will allow a smaller axial deflection, because of the resultant force distribution on the diaphragm, and vice versa.

Figure 4A:
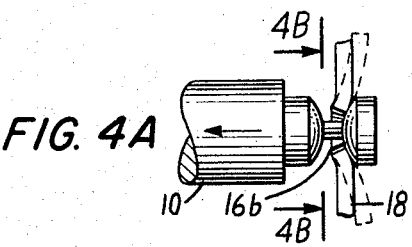
Figure 4B:
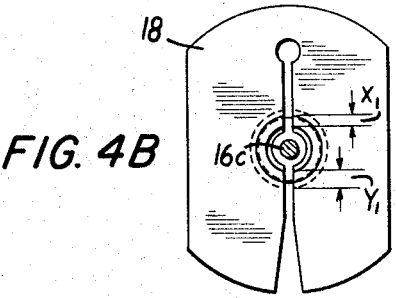

FIGURES 4A and 4B are identical to FIGURES 3A and 3B except that they depict the bearing action at the shoulder 16b of the groove 16. As will be apparent therefrom, precisely the same effect occurs when the thrust force is applied in the direction of the arrow of FIGURE 4A, the annular contact areas $X_1$ and $Y_1$, indicating operating condition with different thrust loads. From consideration of both FIGURES 3A and 4A, it will be apparent that the assembly of FIGURE 1 is a bi-directional thrust bearing providing both the thrust force damping and constant unit bearing pressure features described above. The bearing is thus admirably suited for applications where bi-directional, e.g., vibratory, thrust forces are present. Of course, it will be understood that where unidirectional thrust forces are encountered, the groove 16 may be provided with but one sloped shoulder, providing the same advantages for the one direction of thrust.

Figure 5:
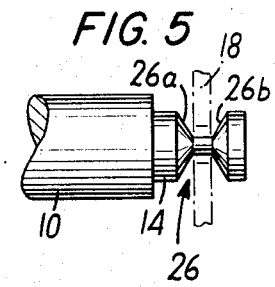
FIGURE 5 is a fragmentary view of another modification of the bearing shown in the preceding figures; and, FIGURE 6 is a cross section of an electric motor driven fan incorporating the thrust bearing shown in FIGURES 1 and 2.

A modification of the bearing structure of FIGURE 1 is illustrated in FIGURE 5. As indicated therein, the reduced diameter portion 14 of the shaft 10 is provided with an annular groove 26 generally similar to the groove 16 except that the shoulders 26a and 26b are frusto-conical, rather than spherical in shape. In all other respects, the bearings are identical, and the manner of operation discussed with respect to FIGURES 3A and 4A apply similarly to this construction. Under certain conditions, the conical shoulders may be simpler to form than the spherical surfaces.

The materials of which the bearing elements are made depend in large part upon the type of lubrication to be employed in the machinery. If the bearing supporting the shaft 10 within the member 12 is to be provided with a lubricant, it is quite feasible to make both the shoulders defining the groove and the diaphragm of metal, the latter being suitable spring stock. If no lubricant is to be provided at the thrust bearing, it is preferable to make the bearing surfaces of compatible materials providing good wear characteristics. For example, as shown in FIGURE 1, the shoulders 16a may be made of steel or other metal, while the diaphragm 18 can be fabricated of a good wearing plastic such as Teflon or nylon. If desired, the latter may be impregnated with lubricants such as graphite and or molybdenum disulphide. Conversely, the diaphragm 18 may be made of spring steel stock while the shoulders defining the groove 16 may be of a lubricant impregnated plastic. This could be accomplished, for example, by making the reduced diameter portion 14 of the shaft of a solid plastic and rigidly mounting it in the end of the shaft element 10. It will be recognized that other bearing materials will be suitable for use within the principles of the invention and the examples described are not intended to be limiting.

As discussed hereinabove, the resilience, or conversely, the stiffness of the diaphragm element 18 enables damping of the thrust forces. This function is particularly desirable in electric motor applications where magnetic field effects generate vibratory thrust forces. To accomplish the damping function, the stiffness or spring rate of the diaphragm material is selected to insure that the natural frequency of the diaphragm is well above the exciting frequency of the vibrational load.

Figure 6:
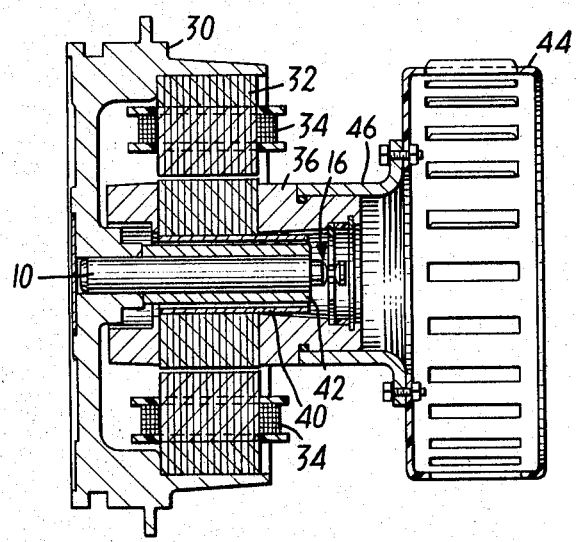

An electric motor employing a thrust bearing of the type described hereinabove is illustrated in FIGURE 6. The motor, which is a conventional induction type, consists basically of a stationary housing 30 within which is mounted the circular stator element 32. The stator windings are illustrated at 34. At its center, the housing 30 also supports in cantilever fashion the shaft element 10, at the right hand end of which is shown the thrust bearing structure 16, 18 similar to that of FIGURE 1.

The rotor structure 36 surrounds and revolves about the shaft 10. In the motor illustrated, the radial bearing supporting the rotor includes a journal sleeve 40 mounted in the rotor bore which cooperates with a complementary sleeve 42 rigidly fastened to the outer surface of the shaft 10. The elements 40, 42 thus form a sleeve type journal bearing. It will be understood that the rotor 36 may be journaled on the shaft 10 by roller bearings, for example, or any other suitable type. Dust shields (not shown) may be provided to prevent dirt and debris from entering the bearing area.

The rotor 36 may operate any form of load device, of which the circumferential blower wheel 44 is a suitable example. The latter is fixed to the rotor by means of a collar 46 which is wedge-fitted and cemented to the rotor. The blower wheel in turn is bolted or otherwise fastened to the collar. When A.C. power is applied to the stator windings via leads (not shown) the rotor 36 is caused to revolve and drive the blower wheel 44. Variations in the attitude of the motor with respect to the horizontal will, of course, affect the thrust forces presented to the thrust bearing structure illustrated. In addition, the vibratory thrust forces engendered as a result of the alternating magnetic field effects present in the motor will be applied to the thrust bearing. Under such conditions of operation, the damping effect provided by the resilient diaphragm is of particular value, tending to minimize damaging vibration with its attendant wear and noise. At the same time, the low starting torque requirement and the self-adjusting feature also contribute improved operation of the motor.

It will be realized from the foregoing that many modifications of the thrust bearing structure described are possible. Variations in shapes and dimensions of the various elements are possible, as are the choice of materials and location of the bearing structure. Although the bearing is shown adjacent an end of the shaft 10, it may be located with equal advantage at other locations along the shaft. Similarly, if the particular application warrants it, several such thrust units may be provided, such as one at either end of the shaft. Also, in the example shown in FIGURE 6 the shaft element 10 is shown to be stationary while the outer member 36 rotates relative thereto, but it is to be understood that the bearing functions equally as well with the shaft as the rotating member, or with both members rotating as long as there is relative rotation therebetween.

Furthermore, although a particular shape of diaphragm element is described, various modifications thereof are possible. In one practical variation, the diaphragm is in the form of a complete disc with an aperture similar in diameter to 18a of FIGURE 2 at its center. To permit assembly, the end portion of the shaft which includes the shoulder 16b (or 26b) is made readily removable, such as by threads, from the reduced diameter portion of the groove. After the disc element is slipped over the narrow shaft portion, the end portion of the shaft is replaced to reconstruct the groove. Such an arrangement does away with the necessity for the assembly slot 18b, c and d of the embodiment shown in FIGURE 2 but functions in precisely the same way and provides the same advantages. Accordingly, the invention is not to be limited except as set forth by the appended claims.

I claim:

1. A thrust bearing for rotating machinery having a shaft rotating relatively to a surrounding member comprising, annular groove means around said shaft by a cylindrical root portion of limited axial extent and a pair of opposed shoulders at either end of said root portion, at least one of the shoulders defining said groove means sloping away from the other such that said groove means is widest at the periphery of said shaft, and resilient diaphragm means having an aperture therein for engagement with said groove means, said diaphragm means adapted to rotate relative to said shaft and being capable of absorbing thrust forces occurring relative to said shaft, the area of contact between said diaphragm means and at least said one of said shoulders being proportional to the magnitude of said thrust forces.

2. A thrust bearing for rotating machinery having a shaft rotating relatively to a surrounding member comprising, annular groove means around said shaft defined by a cylindrical root portion of limited axial extent and a pair of opposed shoulders at either end of said root portion, the shoulders defining said groove means sloping away from each other such that said groove means is widest at the periphery of said shaft, and resilient diaphragm means having an aperture therein for engagement with said groove means, said diaphragm means adapted to rotate relative to said shaft and being capable of absorbing thrust forces occurring relative to said shaft, the area of contact between said diaphragm means and said shoulders being proportional to the magnitude of said thrust forces.

3. Thrust absorbing structure for rotating machinery having a shaft rotating relative to a surrounding member comprising, annular groove means around said shaft adjacent one end thereof defined by a cylindrical root portion of limited axial extent and a pair of opposed shoulders at either end of said root portion, the shoulders defining said groove means sloping away from each other such that said groove means is widest at the periphery of said shaft, and resilient diaphragm means retained within said surrounding member, said diaphragm means having an aperture therein engaging said groove means on said shaft, whereby said shoulders bear against said diaphragm means upon occurrence of relative thrust forces between said shaft and member, the area of contact between said diaphragm means and said shoulders being proportional to the magnitude of said thrust forces.

4. Thrust absorbing structure for rotating machinery having a shaft rotating relative to a surrounding member comprising, annular groove means around said shaft defined by a cylindrical root portion of limited axial extent and a pair of opposed shoulders at either end of said root portion, at least one of the shoulders defining said groove means sloping away from the other such that said groove means is widest at the periphery of said shaft, and resilient diaphragm means having an aperture therein for engagement with said groove means, said diaphragm means being thinner than the minimum width of said groove means and capable of absorbing thrust forces occurring relative to said shaft, the area of contact between said diaphragm means and said shoulders being proportional to the magnitude of said thrust forces.

5. Apparatus according to claim 4 above wherein the spring rate of said resilient diaphragm is selected such that the natural frequency thereof is substantially higher than the vibrational frequency of the rotating member.

6. Apparatus according to claim 4 above wherein said sloping shoulder is generally spherical in configuration.

7. Apparatus according to claim 4 above wherein said sloping shoulder is generally conical in configuration.

8. Bearing structure for rotating machinery such as electric motors or the like comprising, an elongated shaft having a generally cylindrical outer bearing surface, a sleeve having an inner surface adapted to form a journal bearing with the outer surface of said shaft, said shaft extending beyond said sleeve, an annular groove around said shaft extension defined by a cylindrical root portion of limited axial extent and a pair of opposed shoulders at either end of said root portion, the shoulders defining said groove sloping away from each other such that said groove is widest at the periphery of said shaft, and resilient diaphragm means having an aperture therein for engagement with said groove, said diaphragm means being thinner than the minimum width of said groove and capable of absorbing thrust forces occurring relative to said shaft, the area of contact between said diaphragm means and said shoulders being proportional to the magnitude of said thrust forces.

9. Thrust absorbing structure for rotating machinery having a shaft rotating relative to a surrounding member comprising, annular groove means around said shaft, at least one of the shoulders defining said groove means sloping away from the other such that said groove means is widest at the periphery of said shaft, and resilient diaphragm means having an aperture therein for engagement with said groove means, said diaphragm means being thinner than the minimum width of said groove means and capable of absorbing thrust forces occurring relative to said shaft, said shoulders and said diaphragm means comprising complemental thrust bearing surfaces, one of which is a metal and the other of which is a lubricant-impregnated plastic.

10. A thrust bearing according to claim 1 wherein the aperture in said diaphragm means has a minimum dimension greater than the diameter of said root portion of said groove means.

11. A thrust absorbing structure according to claim 4 wherein the aperture in said diaphragm means has a minimum dimension greater than the diameter of said root portion of said groove means.

12. Bearing structure according to claim 8 wherein the aperture in said diaphragm means has a minimum dimension greater than the diameter of said root portion of said groove means.

References Cited by the Examiner

UNITED STATES PATENTS

| | | | |
|---|---|---|---|
| 953,479 | 3/1910 | Mason | 308—163 |
| 2,487,803 | 11/1949 | Heimann | 308—163 |
| 2,737,424 | 3/1956 | Greger | 308—163 |

FOREIGN PATENTS 1,104,149  6/1955  France.

MARTIN P. SCHWADRON, *Primary Examiner.*

FRANK SUSKO, *Examiner.*